United States Patent [19]

Tanaka

[11] Patent Number: 5,666,554
[45] Date of Patent: Sep. 9, 1997

[54] MULTI MEDIA PRESENTATION SYSTEM

[75] Inventor: Eiichiro Tanaka, Tokyo, Japan

[73] Assignee: NEC Corporation, Tokyo, Japan

[21] Appl. No.: 292,285

[22] Filed: Aug. 18, 1994

[30] Foreign Application Priority Data

Aug. 18, 1993  [JP]  Japan ................................ 5-203791

[51] Int. Cl.$^6$ ................................................ G06T 1/00
[52] U.S. Cl. ......................... 395/806; 395/603; 345/326
[58] Field of Search ................................... 395/154, 155, 395/157, 161, 600, 148; 345/806, 807, 326, 601–610

[56] References Cited

U.S. PATENT DOCUMENTS

| 5,109,482 | 4/1992 | Bohrman ............................... 395/154 |
| 5,385,475 | 1/1995 | Sudman et al. ..................... 434/307 R |
| 5,394,548 | 2/1995 | Nakajima et al. ...................... 395/650 |
| 5,412,774 | 5/1995 | Agarwal et al. ......................... 395/157 |
| 5,414,808 | 5/1995 | Williams ............................... 395/154 |

FOREIGN PATENT DOCUMENTS 1-233489  9/1989  Japan .

OTHER PUBLICATIONS

QuickTime user's manual, chapter 1 (pp. 1–14), chapter 2 (pp. 1–31) 1993.

Authorware Professional User's Guide, pp. 20–137 Dec. 1992.

Primary Examiner—Almis R. Jankus
Assistant Examiner—Joseph H. Feild
Attorney, Agent, or Firm—Foley & Lardner

[57] ABSTRACT

A multi media presentation system records a multi media statement including a scenario which specifies when an instruction for controlling display of media data in a display region and for controlling variation of display condition is to be executed by designating a predetermined start condition for the instruction. A media display table which contains information relating to the display region of the media data and information relating to the display condition is managed and used to control display of the media data. The media display table is updated using the instruction upon occurrence of the predetermined start condition for the instruction. The predetermined start condition includes at least one of instruction execution timing, a specific user input through an input means, and specific display condition of the media data.

17 Claims, 8 Drawing Sheets

CAR1　　　　　TEXTA
(picA i=1)　　(TextB i=1)

PLANE　　　　PLANEtext
(picA i=2)　　(TextC number=1, i=1)

MULTI MEDIA PRESENTATION SYSTEM

BACKGROUND OF THE INVENTION

1. Field of the Invention

The present invention relates to a multi media presentation system for displaying electronic multi media information.

2. Description of the Related Art

When multi media information is displayed, a scenario describing display position and display time of media data becomes necessary. It should be noted that, throughout the disclosure and claims, the wording "media data" generally refers to data to be handled by a multi media system, and includes text data, image data, motion video image data, audio data and so forth, and the wording "media display" is used to represent a reproduction of data into man-perceptible form, such as visual data displayed on a display screen, printed hard copy, audible data and a mixture thereof.

For instance, as discussed in Japanese Unexamined Patent Publication No. Heisei 1-233489, entitled "Data Display Method and System Therefor", there is a method, in which a data display timing is described by a non-programming language and a time table is generated on the basis of the data display timing for displaying data sequentially. On the other hand, as discussed in Japanese Unexamined Patent Publication No. Heisei 1-144901 entitled "Data Editing/Displaying Method and System Therefor", there is another method, in which the above-mentioned method is extended by including a display timing of an interaction button for interactively displaying data in the scenario, and the interaction button is displayed at a predetermined timing on the basis of the scenario for displaying corresponding data at a timing of button input.

In both of the conventional methods, only media display and erasure can be described. Therefore, it is not possible to control the display in a manner to vary the display condition of the displayed media data according to elapsed time or by command input by the user. For instance, in the conventional system, it is not possible to vary display condition by providing variation of luminance for the displayed media data, providing visual effect, moving or expanding or contracting the display area, at a predetermined timing.

Furthermore, since a medium name is directly designated in the scenario, it is difficult to modify the scenario or multi media statement for use with another media data display by simply replacing media data.

In addition, when a multi media statement which is variable depending upon displayed input and/or display condition, such as a dynamic link, all branching conditions have to be described in the scenario. Therefore, in such a case, the multi media statement inherently contains a large amount of data.

SUMMARY OF THE INVENTION

It is a first object of the present invention to provide a multi media presentation system which is capable of varying a display condition of the media data according to an elapsed time or by an input of user, such that lightness and/or luminance of the displayed media data is varied, a special effect is provided, the displayed media data is moved, and/or a display area of the media data is expanded or contracted, at a predetermined timing.

A second object of the invention is to provide a multi media presentation system which does not require direct designation of a media name in a scenario and thus can facilitate modification of a multi media statement for use one multi media statement for one media data for another media data.

A third object of the invention is to provide a multi media presentation system which permits description of the multi media statement with relatively small amount of data for media data which differentiates the multi media statement depending upon an input or display condition, by providing query statement for a data base in the scenario.

According to one aspect of the present invention, a multi media presentation system comprises:

storage means for storing a multi media statement including a scenario describing instruction for controlling display of media data in a display region and variation of the display condition, according to a predetermined start instruction, and at least one of a media data to be displayed and a storage position information of the media data;

media display information managing means for storing information relating to the display region of the media data and information relating to the display condition;

display means for displaying the media data on the basis of the media display information stored in the media display information managing means; and instruction executing means for executing the instruction described in the scenario of the multi media statement according to the predetermined start condition and whereby updating the media display information.

The instruction described in the scenario of the multi media statement may include at least media display information name, instruction name, media data name, delay period for execution of the instruction and parameter for execution of the instruction, as internal information.

On the other hand, the multi media presentation system may further comprise processing means for identifying the scenario to be executed from the multi media statement, retrieving instruction to be executed on the basis of the start condition from the scenario, reading out the instruction adapted to the start condition from the scenario, and to command execution to the instruction to the instruction executing means. Also, in the preferred construction, the multi media presentation system further comprises display managing table storing means for storing the instruction to be executed by the instruction executing means in order of execution timing, and the instruction executing means arranges the instructions commanded by the processing means in order of execution timing on a display managing table and executes the instruction arranged on the display managing table in order according to the execution timings.

Preferably, the scenario of the multi media statement is described with taking at least one of instruction execution timing, a specific event input of a user through an input means and specific display condition of the media data as the start condition.

The multi media presentation system may further comprise processing means for describing constraint between the media display information in the scenario of the multi media statement and identifying scenario to be executed from the multi media statement, retrieving instruction to be executed on the basis of the start condition defined by the scenario, reading out the instruction adapted to the start condition, and commanding execution of read out instruction to the instruction executing means, and the instruction executing means arranges the instruction designated by the processing means, updates the media display information by executing the instruction in order of execution timing, updates the media display information by executing the instruction arranged on the display managing table, and transfers the updated media display information to the media display information managing means for modifying display condition of the media data. The constraint between the media display information described in the scenario of the multi media statement may include at least a designation of preferential order in the case where media data display is conflicting between at least a plurality of media display information.

A specific event input of a user through an input means and specific display condition of the media data may be described as the start condition in the scenario, and the processing means reads out instruction described in the scenario at the occurrence of the specific event input of a user through an input means and the specific display condition of the media data as the start condition. The instruction executing means may divide the instruction for a plurality of stages of display condition of the media data and into a plurality of instructions for performing display at each stage, and arranges the divided instruction on the display managing table when execution for the instruction varying the display condition of the media data according to elapsed time is commanded.

The multi media statement may contain at least a media data name for displaying and a display region information describing a display position, display size and display method of the display region for displaying the media data as initial value of the media data display, and the media information managing means stores the display region information from the multi media statement as the initial value of a media display information at the initial state of the media data display. Also, the instruction contained in the multi media statement may include a media type indicative of a category of the media in a database storing the media data to be displayed and a media data retrieval expression for retrieval against the data base, and, the system further comprises a media database for managing the media data per media type, the media data to be displayed being identified by issuing query to the media database with the media type and the retrieval expression described in the instruction.

According to another aspect of the invention, a multi media presentation system comprises:

storage means for storing a multi media statement including a scenario describing instruction for controlling constraint between a plurality of display regions, display of media data in a display region and variation of the display condition, according to a predetermined start instruction, and at least one of a media data to be displayed and a storage position information of the media data;

media display information managing means for storing information relating to the display region of the media data and information relating to the display condition;

display means for displaying the media data on the basis of the media display information stored in the media display information managing means;

instruction executing means for executing the instruction described in the scenario of the multi media statement according to the predetermined start condition and whereby updating the media display information;

processing means for identifying scenario to be executed from the multi media statement, retrieving instruction to be executed on the basis of the start condition contained in the scenario, reading out the instruction adapted to the condition from the scenario, and commanding execution of the read out instruction to the instruction executing means; and recording means for recording a display managing table storing instructions to be executed by the instruction executing means in order of execution timing, the instruction executing means arranging the instructions designated by the processing means for execution on the display management table in order of execution timing and executing the instructions arranged on the display management table in order based on the execution timing.

The instruction executing means may arrange the instructions designated by the processing means for execution on the display managing table in order of execution timing, updating the media display information by executing instructions arranged on the display managing table sequentially based on the execution timing, and when update of the media display information satisfies the constraint between the media display information, the updated media information is transmitted to the media display information managing portion for modifying the display condition of the media data.

Other objects, advantages, features of the present invention will become clear from the detailed description given hereinafter.

BRIEF DESCRIPTION OF THE DRAWING

The present invention will be understood more fully from the detailed description given herebelow and from the accompanying drawings of the preferred embodiment of the present invention, which, however, should not be taken to be limiting to the invention, but are for explanation and understanding only.

In the drawings.

DESCRIPTION OF THE PREFERRED EMBODIMENT

Figure 1:
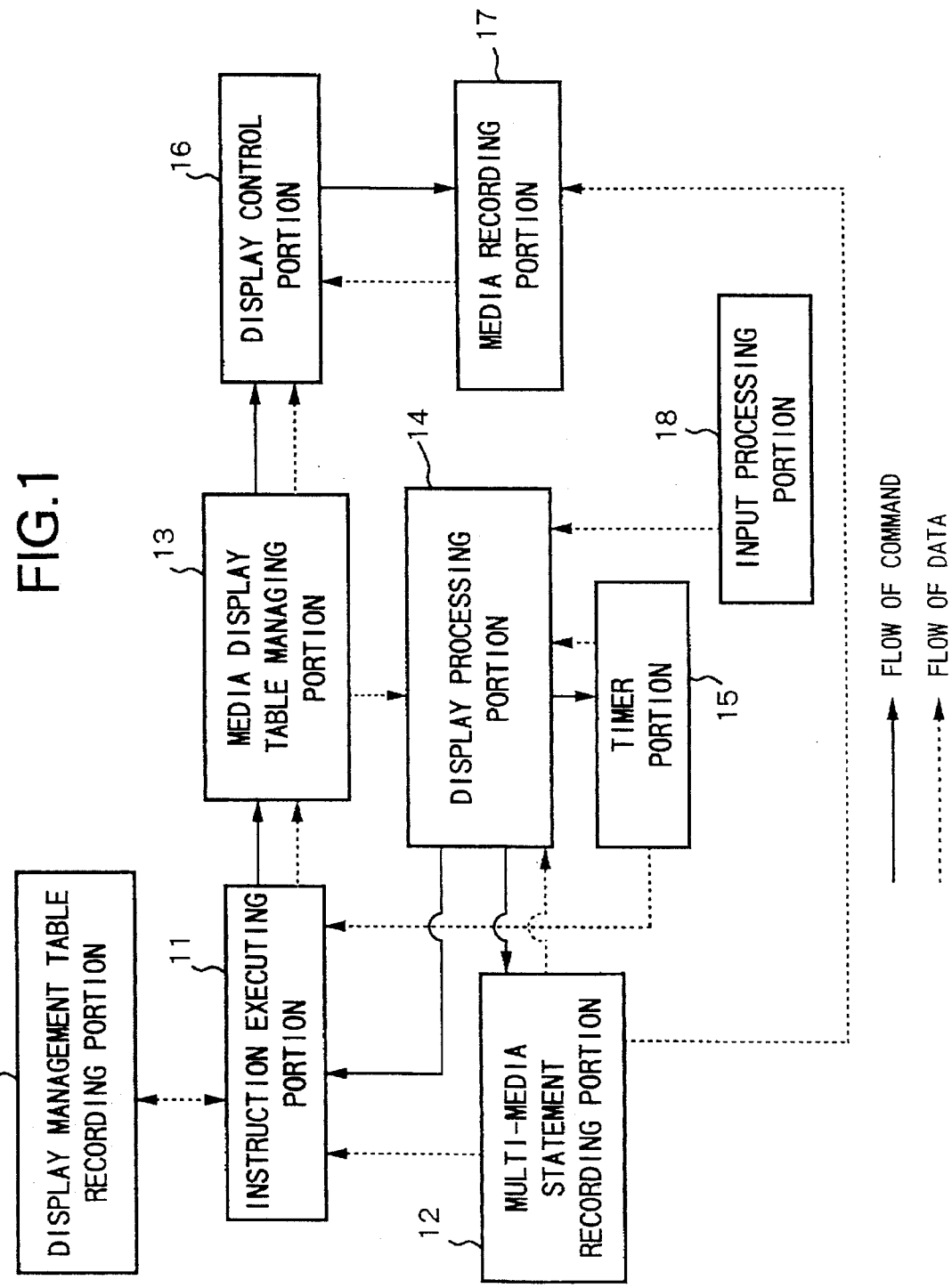
FIG. 1 is a block diagram showing a construction of the first embodiment of a multi media presentation system according to the present invention.

The preferred embodiments of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In some instances, well-known structures are not shown in detail so that the present invention will not be unnecessarily obscured.

Initially, a structure of a multi media statement (scenario) 200 to be employed in a multi media presentation system according to the present invention, will be discussed with reference to FIG. 2. The multi media statement to be employed in the present invention is generally divided into an instruction declaring portion 201, a scenario portion 202, a display region information portion 203 and a media information portion 204. Respective portions will be discussed hereafter. It should be noted that the order of respective elements should not be limited to the illustrated order but can be of any desired order.

(A) Instruction Declaring Portion 201

The instruction declaring portion 201 describes an instruction to be employed for presentation of media data. The described instruction contains a media display table name, an event instruction, a media name, a delay period and an option as internal information. Respective items contained in the instruction are as follows:

(1) The media display table name is a name of table or object containing information for controlling media display on a display. The content of the media display table will be discussed later.

(2) The event instruction is a process instruction to be executed with respect to the media display table and classified as follows, for example.
 (a) Media Presentation Instruction
  This is an instruction group for performing display of a designated media data. Also, presentation effects, such as special effects including fade-in, wipe and so forth are performed. A period required for special effect may be designated as an option item.
 (b) Media Display Table Control Instruction
  This instruction is an instruction group for performing moving of the display region of the media data, variation of the display size, modification of the constraints between the display regions, modification of the configuration and so forth. A period required for making execution of the instruction effective, coordinates of field after modification and so forth are contained as an option item.
 (c) Display Condition Modifying Instruction
  This is an instruction group for controlling specific media in time, such as a variation of the luminance and lightness of the displayed media data, multiple speed reproduction of dynamic image and/or voice, slow reproduction, reverse reproduction and so forth.

(3) The media name designates the name of the media data.

(4) The delay period is designated when execution of the even instruction is delayed.

(5) The option is an item for designating factors depending upon the event instruction and so forth. For instance, a timing to perform effect, parameter of movement for moving of the display region and so forth are described in this item.

The followings are example of format describing the instruction.

```
Instruction name:
  Media Display  Table Name  Event Name
                 Media Name  Delay Period  Option
```

Concrete example of description of the instruction according to the format set out above is as follow:

```
Event1:
  Field1  Fade-in   OpenIngpic   0   Effect = 3
Event2:
  Field2  Erase     Null         0
```

In the example of the instruction name "Event1", the "effect=3" is a factor indicating that 3 sec. is taken for execution process of this event name. Namely, the effect of execution of the event name is obtained after 3 sec. of execution. Accordingly, the instruction name "Event1" displays the media data of "openIngpic" by fade-in for 3 sec. On the other hand, the instruction name "Event2" is indicative of erasure of the media data. Here, "null" represents empty media.

On the other hand, it is possible to define an instruction set aggregating a plurality of instructions to be executed simultaneously. The instruction set has an instruction set name and an internal structure including a plurality of instruction. By delaying a specific instructions, execution may be delayed only for the corresponding instruction.

An example of the description format of the instruction set is as follow:

```
Instruction Set Name:
  Media Display  Table Name  Event Name
                 Media Name  Delay Period  Option
  Media Display  Table Name  Event Name
         :       Media Name  Delay Period  Option
         :           :           :           :
         :           :           :           :
```

Figure 5A:
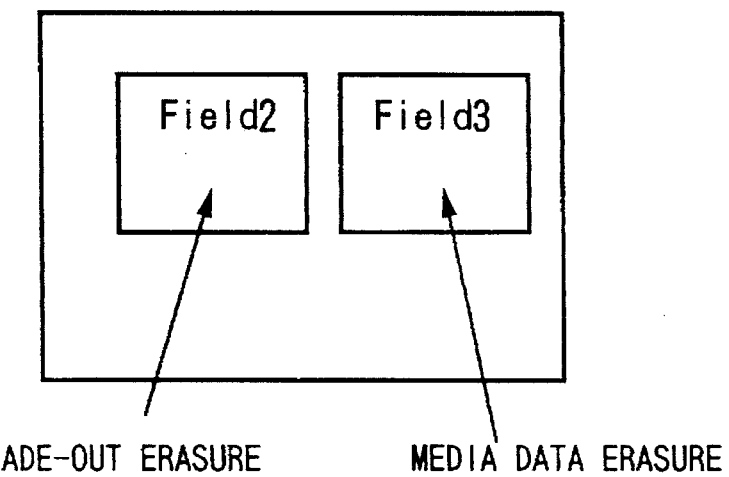
FIGS. 5(A) and 5(B) are illustrations showing an example of a condition transition of a display screen in the first embodiment of the multi media presentation system.
Figure 5B:
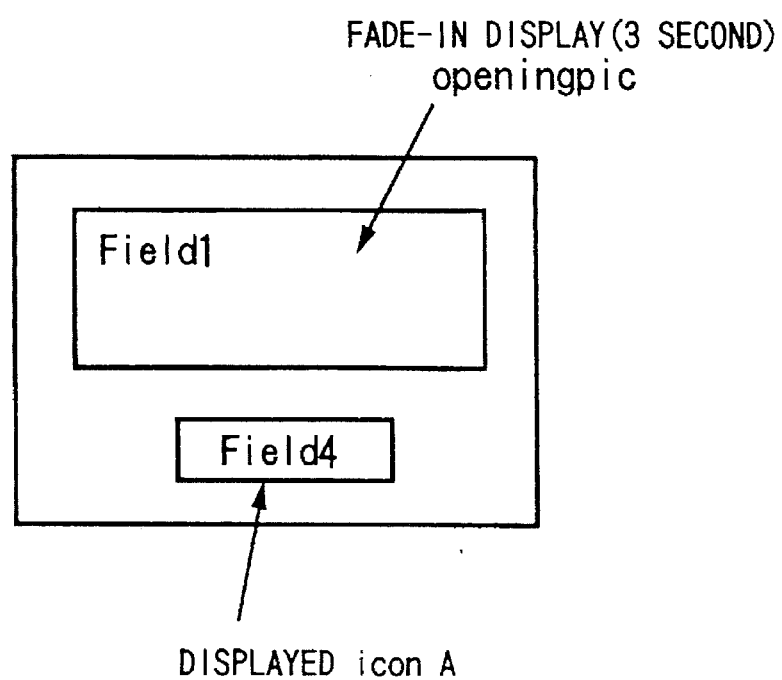

For example, when the display condition is varied from the condition of FIG. 5(a) to the condition of FIG. 5(b), it can be described by the instruction set as follow:

```
Event1
  Field1:  Fade-in   OpenIngpic  0   Effect = 3
  Field2   Fade-out  Null        0   Effect time = 3
  Field3   Erase     Null        0
  Field4   Display   iconA       0
```

Here, "Effect time=3" is a factor necessary for the event indicating that 3 sec. is taken to complete fade-in. "Null" represents an empty media. In the Field2, the media data is erased in 3 sec. of fade-out. In the Field3, the media data is simply erased. These instructions included in the instruction set name "Event1" is executed simultaneously.

Here, when no event process is performed for the media display table, the previous display condition is maintained as is.

(B) Scenario Portion 202

In the scenario portion 202, a declaration of the media display table to be operated by the instruction set or instructions, constraints between the media display tables and order of execution of the instruction set or instructions are designated.

As the constraint between the media display tables, the followings may be defined.

(1) Concerning Overlapping of Display Regions

For instance, if display regions of two media data overlap to each other, it determines which display region should be shown at front.

(2) Concerning Spatial Positional Relationship

The display position of the display region is designated relative to the positions of other regions.

(3) Concerning Possibility of Simultaneous Presence

For example, if two display regions cannot be present at the same timing, it designates which display region will have priority.

The order of execution of the instructions or the instruction set is designated by arranging the instructions or instruction set in order of execution. For example, it may be described by designating method for executing instruction at a specific time.

| Execution No. | Instruction | Start Condition |
|---|---|---|
| 1 | Event1 | |
| 2 | Event2 | +30 |
| 3 | Event3 | +30 |
| 4 | Event4 | 2:+40 |
| 5 | End | 4:+30 |

In the foregoing example, the instructions are executed in order of the execution numbers. In the start condition, an elapsed period from initiation of one preceding instruction or the designated instruction, is designated to set as execution initiation timing. For example, in the execution number 2, the instruction "Event2" is designated to be executed after 30 seconds of execution of the instruction "Event1" as immediately preceding instruction. On the other hand, in the execution number 4, the instruction "Event4" is designated to be executed after 40 seconds of execution of the instruction "Event2" as the instruction in the designated execution number.

It is also possible to designate execution timings of respective instructions by a total time from initiation of display. The following table shows the same order and same content to the foregoing example.

| Time | Instruction |
|---|---|
| 0 | Event1 |
| 30 | Event2 |
| 60 | Event3 |
| 70 | Event4 |
| 100 | End |

Furthermore, it should be noted that the instruction execution order in the scenario is not determined specifically depending upon the elapsed time but can be determined depending upon other factors. For instance, it is possible to branch the instruction in the scenario depending upon occurrence of event by the user or the display condition for executing instruction.

For example, the scenario can be described as follow:

| Identifier: | Start Condition |
|---|---|
| Instruction set 1 | |

Here, the start condition is added to the identifier so that the instruction (instruction set 1) is executed when the start condition is satisfied. As the start condition, time or user input, the condition of the specific media display table and so forth can be designated. The following is an example:

```
Start
    Eventset1;
PH1: Start + 30
    Eventset2;
PH2: mouseup (0, 0–100, 100) & PH1
    Events
END: PH2 + 30
```

Here, mouseup represents the status of the mouse and the figures in the parenthesis ( ) represents coordinates on the display screen.

In the shown case, Start is always started at first. Then, the instruction "Eventset1" is executed. Subsequently, after 30 seconds of starting, the instruction "Eventset2" is executed. Here, when the instruction "Eventset2" is executed, the instruction "Eventset3" of the identifier "PH2" is executed when the mouse is clicked while the mouse pointer is presented in the coordinate position within a range of (0, 0 to 100, 100). After 30 seconds from starting of execution of the instruction "Eventset3" of the identifier "PH2", the scenario is terminated by the identifier "END". If the Eventset2 is not executed by the identifier "PH1", the instruction "Eventset3" will not be executed even when the mouse is clicked with placing the mouse pointer at the coordinate position in the range of (0, 0 to 100, 100).

In addition to the above-mentioned, description can be made employing program language, such as C-language, BASIC, Fortran and so forth.

(C) Display Region Information Portion 203

The display region information portion 203 contains initial value to be given for the media display table as information. The display region information includes information, such as display region of the media display table, window configuration, media data display method and so forth. Respective information will be discussed herebelow.

(1) Information relating to Display Window

This information is a group of information designating configuration of a window region, display start position, window size and so forth. The window configuration may be rectangular, circular or a configuration depending upon the configuration of the media data and so forth.

(2) Information relating to Window Display Condition

This information includes media name, effect for display processing, media assigning method, color palette information and so forth in the initial condition. The media assigning method include definition if the media information is to be displayed without modification of contraction scale or not when the sizes of the media data and the window or when window size is varied.

An example of description of this display region information portion 203 is as follow:

```
Display Region Information Name
    (Media Display Table Name)
        Display Coordinate (X, Y)
        Window Size
        Window Type
        Layer
        Palette Information
        Media Name
        Assigning Method
```

(D) Media Information Portion 204

The media information portion 204 records an entity (data or content) of the media data used by the multi media statement or the position and name storing the entity.

Hereinafter will be discussed the first embodiment of a multi media presentation system according to the present invention, for performing media presentation using the multi media statement having the structure as set forth above. FIG. 1 is a block diagram showing the first embodiment of the multi media presentation system for realizing a multi media presentation based on the multi media statement.

The multi media presentation system comprises an instruction executing portion 11, a multi media statement recording portion 12, a media display table managing portion 13, a display processing portion 14, a timer portion 15, a presentation or display control portion 16, a media data recording portion 17, an input processing portion 18, and a display management table storage portion 19.

The instruction executing portion 11 includes an internal memory for storing the constraint between media display tables designated by the scenario. The instruction executing portion 11 is responsive to an execution command from the display processing portion 14 to perform scheduling by calculating an exact execution time on the basis of the delay period and by recording in a display management table. When the execution time designated for the instruction on the display management table is reached, the instruction executing portion 11 executes the instruction and updates the media display table. Upon execution, reference is made to the constraint between the media display table recorded in the internal memory so that updating of the multi media table will not be performed when the constraint is not satisfied.

On the other hand, the instruction executing portion 11 divides the instruction for execution in a divided manner for several times, each division having an effecting period designated in the option, in the case where the display condition is varied as time elapsed, such as instruction for fade-in, fade-out or moving. For example, fade-in display instruction is executed by performing the display while varying the luminance of the display region in a step-wise fashion within the effecting period. In such a case, the effecting period is divided into a plurality of stages with a given time interval, and the display is performed with increasing luminance per every divided stage by sequentially executing the display information to realize the fade-in effect. Accordingly, in this case, the fade-in display instruction is divided into a plurality of display instructions each of which gradually increases the display luminance.

The multi media statement recording portion 12 comprises a memory, a magnetic recording medium and so forth, and records the multi media statement.

The media display table managing portion 13 performs recording and management of the media display table for managing the media display information. The media display table is information for controlling the display condition of the designated region of the display screen. In response to the media display table updating command, the media display table managing portion 13 operates the presentation portion 16 for modifying the display condition on the screen on the basis of the modified content by modifying the media display table.

The media display table manages the following information.

(1) Information relating to the position on the display region on the screen, size of the window and layers;

(2) Information relating to the luminance of the display region on the display screen, the media assigning method, transparency and special effect; and (3) Information relating to the media condition being currently displayed, such as frame number and the display time and so forth.

The display processing portion 14 manages display of the media data. The display processing portion 14 identifies the currently executed instruction and subsequently executed instruction of the scenario mainly based on the time and transmits the instruction execution command to the instruction executing portion 11 according to the scenario. On the other hand, the display processing portion 14 checks the input by the user and the state of the specific media display table and executes branching of the instruction of the scenario according to the given condition depending upon the user input or the state of the specific media display table.

The timer portion 15 includes an internal clock and manages the time.

The presentation portion 16 comprises a display, display screen control memory for displaying the media data on the display, and so forth. The presentation portion 16 modifies the state of the display screen for erasure, moving or providing special effect for the displayed media data with respect to the display region on the display designated by the media display table managing portion 13.

The media recording portion 17 stores the media data as digitized data on a recording medium, such as a magnetic disk, an optical disk, a memory and so forth. The media recording portion 17 reads out the media data designated by the display processing portion 14 and operates the presentation portion 16 for displaying the media data on the display according to the method designated by the display processing means 14.

An input processing portion 18 manages input devices, such as a mouse, keyboard and so forth and transfers an input information from the mouse, keyboard and so forth to the display processing portion 14.

The display management table recording portion 19 manages and records a display management table which modifies the order of display according to the time. The display management table is a table for scheduling the execution of instruction and stores the instructions so that the instructions can be executed for displaying in exact order on the basis of the instruction including the delay time and newly added instruction and so forth. The following is an example of description in the display management table.

| Time | Media Display Table Name | Event Name | Parameter |
|------|--------------------------|------------|-----------|
| Time | Media Display Table Name | Event Name | Parameter |
| Time | Media Display Table Name | Event Name | Parameter |
| :    | :                        | :          | :         |
| :    | :                        | :          | :         |

Here, the parameter is a factor of the event instruction and includes media name or value to be varied. The instruction executing portion 11 performs scheduling of execution of the instructions by recording the instructions on the display management table in the order of execution timing on the basis of the execution time and other start condition from the scenario given from the display processing portion 14. In practice, the instruction for the media data display is executed according to the schedule recorded in the display management table.

Figure 2:
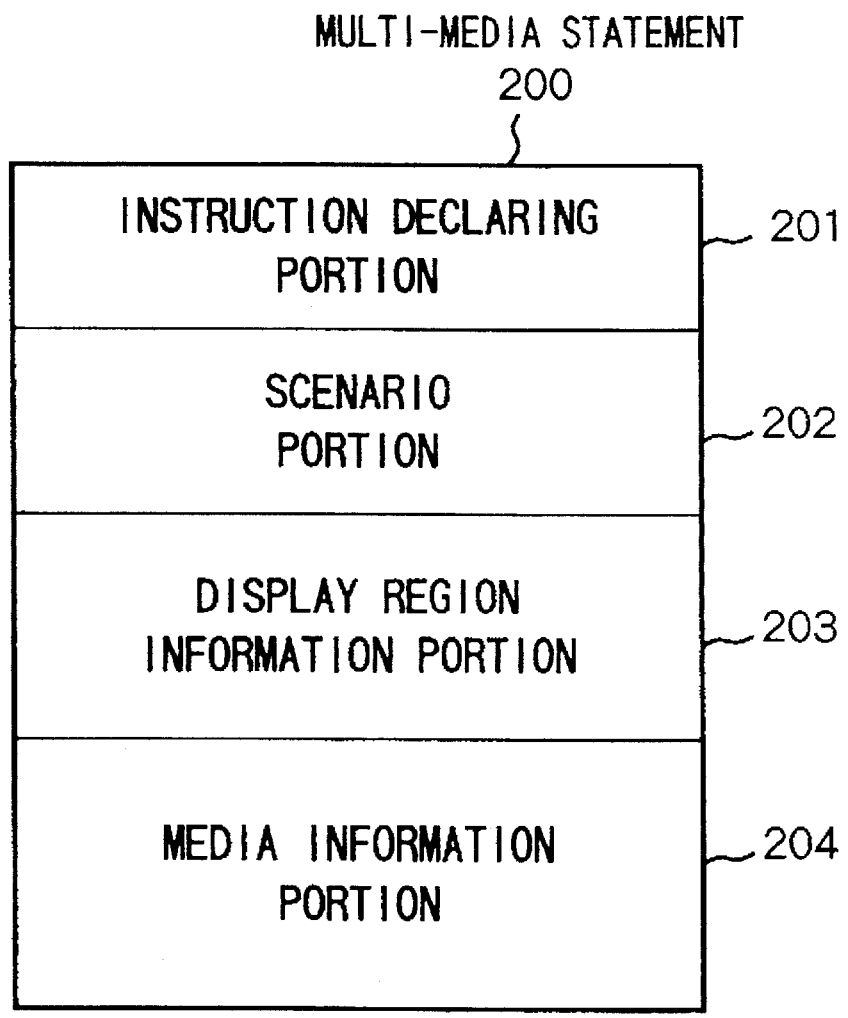
FIG. 2 is an explanatory illustration showing an example of a multi media statement to be used in the first embodiment of the multi media presentation system.
Figure 3:
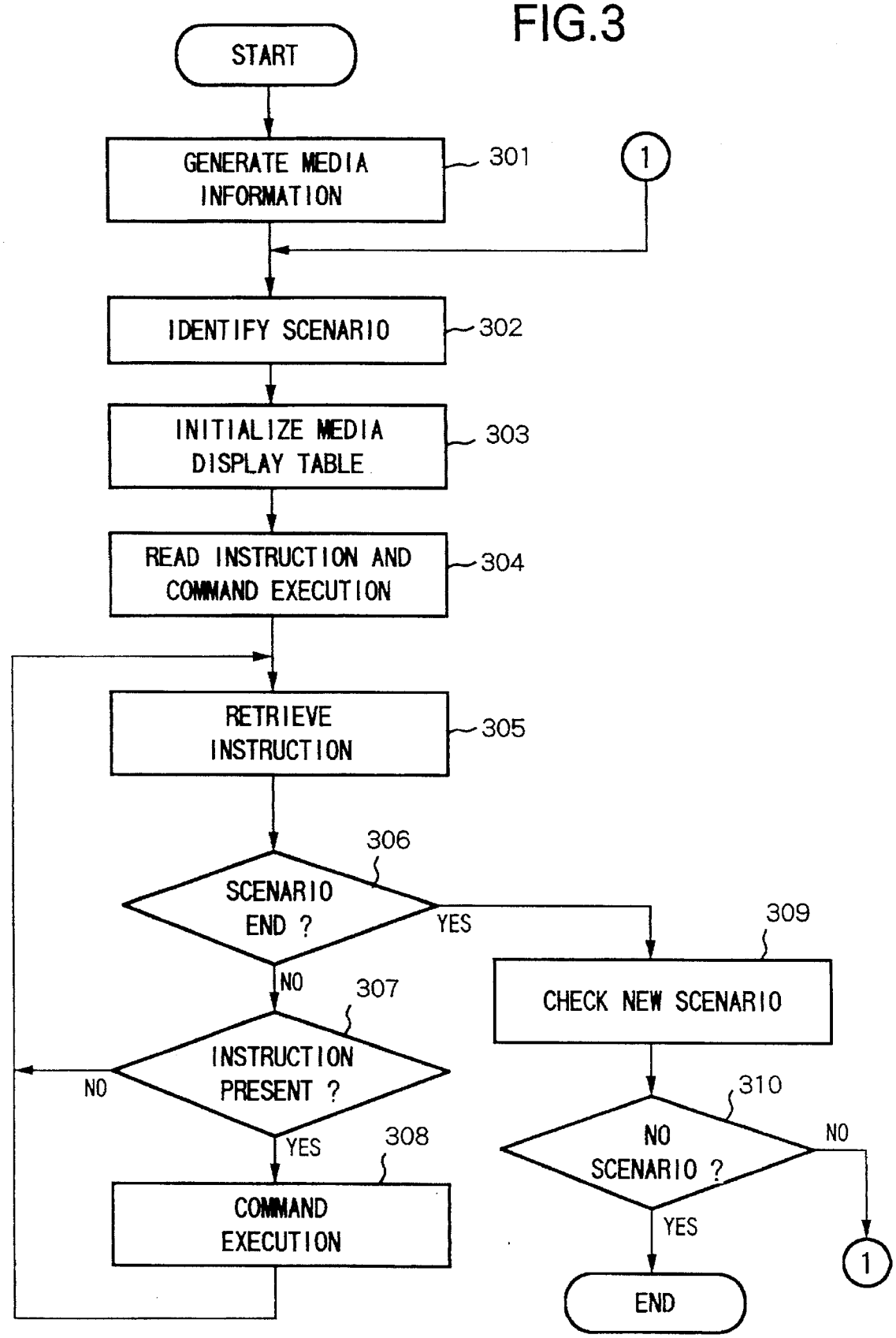
FIG. 3 is a flowchart showing operation of a display processing portion in the first embodiment of the multi media presentation system.

FIG. 3 is a flowchart showing an operation of the display processing portion 14 as set forth above. The media data displaying process according to the multi media statement 200 by the display processing means will be discussed in greater detail with reference to FIGS. 2 and 3.

At first, the media data to be displayed is read out from the media information portion 204 of the multi media statement 200 recorded in the multi media statement recording portion 12, and generates a media information to store in the media recording portion 17 (step 301).

Then, the scenario to be initially executed is identified in the scenario portion 202 of the multi media statement 200. Then, the scenario to be executed is transferred to the instruction executing portion 11 (step 302).

The media display table to be used in the step 302 is generated on the basis of the information of the display region information portion 203. Then, the media display table thus generated is initialized (step 303).

The first instruction of the scenario identified as the scenario to be initially executed is read out. Then, a command for execution of the read out instruction is issued to the instruction executing portion 11 (step 304).

Subsequent to reading out of the first instruction of the scenario and commanding execution of the read out instruction, the following processes are repeatedly performed through steps 305 to 308 until execution of the all instructions in the scenario is completed.

The steps 305 to 308 form a loop for repeating the processes therethrough. In the process, the instruction to be executed in next order is retrieved in the scenario (step 305). Practically, retrieval process is performed for finding instruction which satisfies the execution time or other start condition designated in the scenario.

Namely, retrieval is performed whether or not the instruction which satisfies the execution time designated as the start condition in the scenario is present. Also, retrieval is performed whether or not the special event (clicking of mouse or depression of a specific key on the keyboard) by the user designated as the instruction start condition has occurred on the basis of the input information from the input processing portion 18. Further retrieval is performed to check whether the media data display condition is consistent with the specific display condition designated as the instruction start condition on the basis of the information of the media display table managing means 13.

On the other hand, in conjunction with retrieval of instruction, check is performed whether or not execution of instructions in the scenario is completed (step 306).

If the execution of the scenario is not yet completed or no instruction satisfying the start condition is retrieved, the process is returned to the step 305 (step 307).

On the other hand, when the instruction satisfying the start condition is retrieved, the command is fed to the instruction executing portion 11 for executing the retrieved instruction (step 308). Then, process is returned to the step 305.

When completion of instructions in the scenario is judged at the step 306, check is performed whether new scenario to be executed is present in the multi media statement (step 309). If new scenario is present, the corresponding scenario is read out from the scenario portion 202. Then, the process is returned to the step 302 to repeat the process set forth above. On the other hand, when no new scenario is present in the scenario portion as checked at the step 309, the process is terminated at a step 310.

Figure 4:
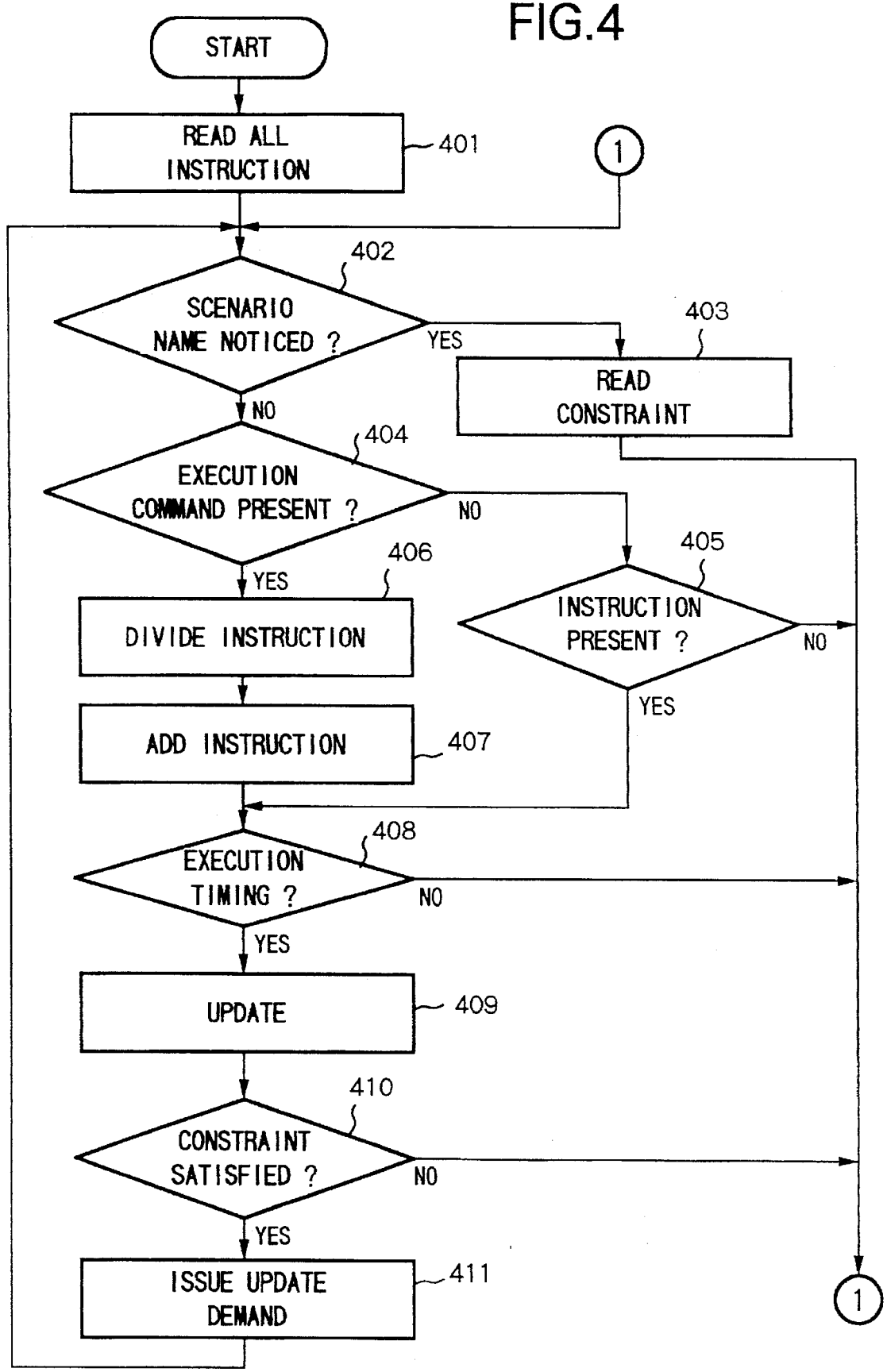
FIG. 4 is a flowchart showing operation of a command executing portion in the first embodiment of the multi media presentation system.

FIG. 4 is a flowchart showing the operation of the instruction executing portion 11. Discussion will be given hereinafter for the media display method according to the multi media statement by the instruction executing portion 11 with reference to FIG. 4.

All instructions included in the multi media statement 200 are read out from the instruction declaring portion 201 (step 401).

Then, check is performed whether a notice command of the scenario name is transmitted from the display processing portion 14 (step 402). When the scenario name is transmitted at the step 402, constraint between the media display tables is read out from the designated scenario. The read out constraint is stored in the internal memory (step 403). Then, process is returned to the step 402.

When the scenario name is not transmitted, check is performed whether the execution command for the instruction is transmitted from the display processing portion (step 404).

In the case where the instruction fed in response to the execution command of the instruction varies the content of the instruction according to an elapse of time, such as an instruction for display including fade-in, fade-out and so forth, the option of the instruction is interpreted and the instruction is divided into a plurality of instructions so that the instruction may be executed seperately in the effecting time designated by the option (step 406). At this time, for each of the divided instruction, information relating to luminance and effect of display is set as display parameter.

For instance, in case of the fade-in display instruction, the effecting period designated by the option is divided into a plurality of stages (i.e. number of execution cycles of the instruction) with a given time interval, and for each of the divided stages, the display instruction is executed for a plurality of times with gradually increasing the display luminance. In this case, the display instruction execution interval and number of cycles to be executed within the effecting period are determined and, in conjunction therewith the parameter, such as display luminance to be set for respective of instruction to be executed, is determined.

If the instruction transmitted in response to the instruction execution command is not the instruction which varies the content according to an elapse of time, the dividing process at the step 406 is not performed.

The instruction transmitted in response to the instruction execution command or the instruction divided at the step 406 is stored in the display management table for performing scheduling of the instructions to be executed by arranging it in order of execution timing (step 407). The instruction for controlling media display is executed according to the schedule stored in the display management table.

When instruction execution command is not transmitted at the step 404, check is performed whether the instruction is present in the display management table (step 405). It the instruction is not present in the display management table as checked at the step 402, the process is returned to a step 402. On the other hand, if the instruction is present in the display management table, then the process is advanced to step 408.

Next, the time measured by the timer portion 15 is monitored to make judgement as to whether the execution timing of the instruction recorded in the display management table is reached (step 408). If the execution timing is not reached, the process is returned to the step 402.

When the reaching of the instruction execution timing is detected through monitoring of the measured time by the timer portion 15, the media display table corresponding to the instruction is loaded in the internal memory. Then, according to the instruction, the media display table in the internal memory is updated (step 409). At this time, according to the constraint between the media display tables, all of the media display tables which are influenced by the newly read in media display table, are also updated.

Then, the media display tables in the internal memory are checked to make judgement whether the media display tables modified by the instruction satisfy the constraint (step 410). If the constraint is not satisfied, execution of instruction is interrupted and the process is returned to the step 402.

If the constraint is satisfied, update command for the corresponding media display table is fed to the media display table management portion 13 (step 411).

Next, discussion will be given for the second embodiment of the multi media presentation system according to the present invention.

At first, discussion will be given for the structure of the multi media statement to be employed in the second embodiment of the multi media presentation system. The instruction in the instruction declaring portion, in place of the media name designated as the factor in the instruction of the first embodiment, a media type is designated. Also, a database retrieval expression is designated in the option item. Here, the media type represents a category of the media in the database storing the media data.

On the other hand, in the instruction for media display, the instruction is extended so that the display can be varied by designating only the media retrieval expression without designating the media name. Here, the description format of the instruction becomes as follow:

```
Instruction Set Name
Media Display Table Name    Event Instruction
                  Media Type    Delay    Option
Media Display Table Name    Event Instruction
                  Media Type    Delay    Option
       :              :          :         :
       :              :          :         :
```

Figure 8A:
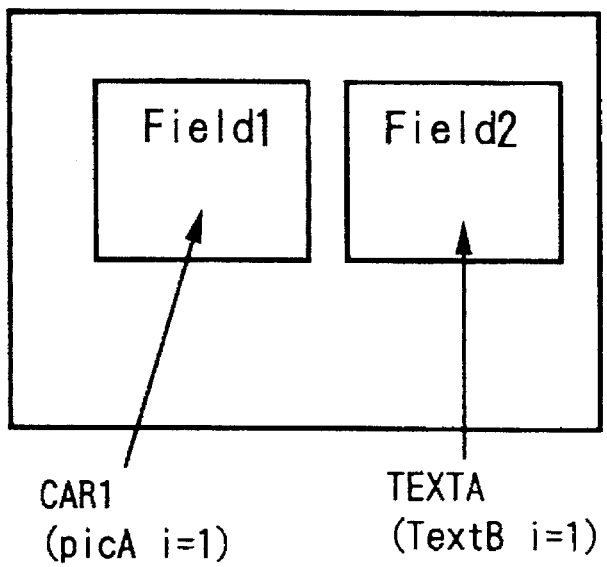
FIGS. 8(A) and 8(B) are illustrations showing an example of a condition transition of a display screen in the first embodiment of the multi media presentation system.
Figure 8B:
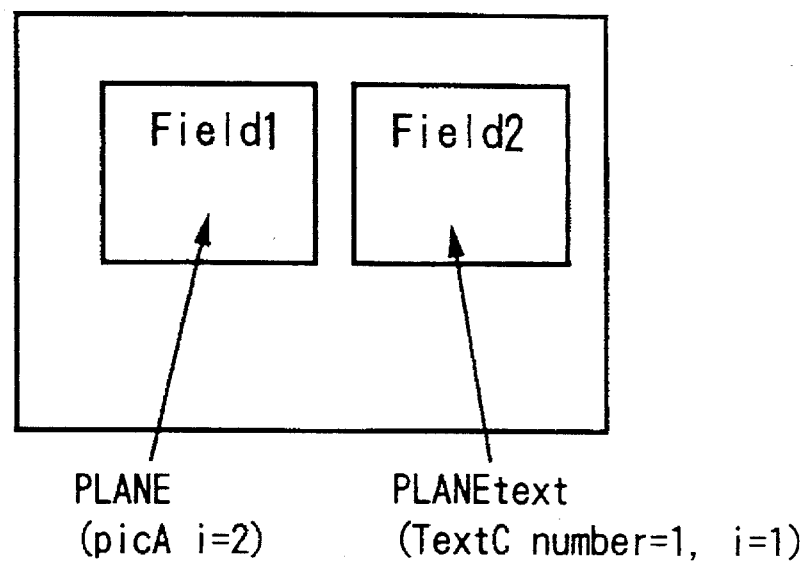

When the display condition is varied from the display condition of FIG. 8(A) to the display condition of FIG. 8(B), the following description is given by the instruction set:

```
EventA
    Field1    Display    PicA    0    Media: I = i + 1;
    Field2    Display    TextC   0    Media:number + 1,i + 1;
```

Here, the relationship between the media type and the media data is managed as database in the following manner:

```
PicA (Media Type)
    i       (variable)           media
    1                            CARI
    2                            PLANE
    3                            TRAIN
    :                            :
TextB (Media Type)
    i       (variable)           media
    1                            TEXTA
    2                            TEXTB
TextC (Media Type)
    Number          i            media
    1               1            PLANEtext
    1               2            TRAINtext
    2               1·           Text1
    :               :            :
```

In "Field1" of FIG. 8(A), it is assumed that, in media type PicA, the media data CARI as i=1 is displayed. The instruction for Field1 of EventA is to display the media data having the same media type (PicA) and i incremented by 1. In this case, "PLANE" designated by i=2 is displayed. On the other hand, in Field2, the media data "PLANEtext" designated by number=1 and i=1 of the media type "TextC" is displayed.

On the other hand, by enabling description for making reference to the value of a buffer input by the user, it becomes possible to vary the data to be displayed by key input of the user. For instance, in the foregoing example, by employing the value of the key input buffer as key input by the user by setting number=KEYBUF, description of the dynamic link becomes possible.

Figure 6:
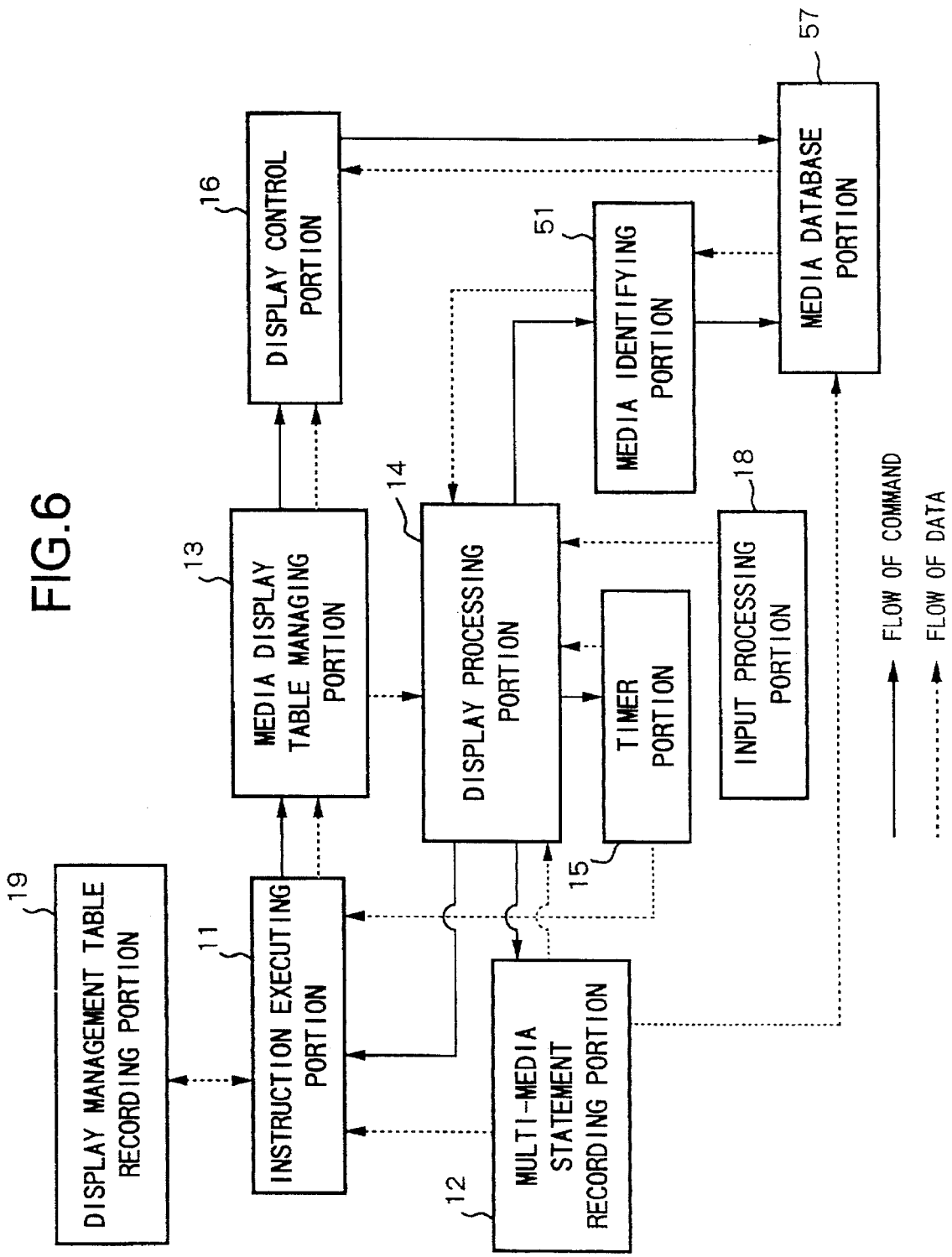
FIG. 6 is a block diagram showing a construction of the first embodiment of a multi media presentation system according to the present invention.

FIG. 6 shows a block diagram of the second embodiment of the multi media presentation system according to the present invention employing the second embodiment of the multi mediate statement.

In the second embodiment of the multi media presentation system illustrated in FIG. 6, in place of the media recording portion 17 in the first embodiment of FIG. 2, a media database portion 57 is provided. Also, a media identifying portion 51 is newly added. Other constructions are the same as those in the first embodiment. Like elements to the first embodiment are represented like reference numerals. However, new item is added to the media display table.

Hereinafter, detailed discussion will be given for the media display managing portion 13, the media database portion 57 and the media identifying portion 51.

In the media display table recorded in the media display table managing portion 13, media type and attribute of the database are added as new items. For instance, in case of the foregoing "Field2" of "EventA", "TextC" as the media type, "number" and "i" as an attribute name, "number" being "1" and "i" being "1" as item values are recorded. On the other hand, the media display table managing portion 13 makes query to the media identifying portion 51 for obtaining the media name. It an error is returned in response to the query, the media name currently displayed is used.

The media database portion 57 manages the media data per respective media type. In response to the query from the media identifying portion 51, the media name is determined uniquely. A media list may be described in a format of conventional relational database, object-oriented database and so forth.

The media identifying portion 51 is responsive to the query from the media display table managing portion 13 to perform retrieval against the media database portion 57. The media name, media type, item number output as the result are transferred to the media display table managing portion 13. Here, if no corresponding data is present in retrieval, error is returned.

Query is performed in a format to be accepted by the media database portion 57. For example, if the media database portion 57 accepts query in SQL format, the query for Field2 in FIG. 8(A) will be modified as follow:

"Select media name From Pica where number=1 and i=1"

Figure 7:
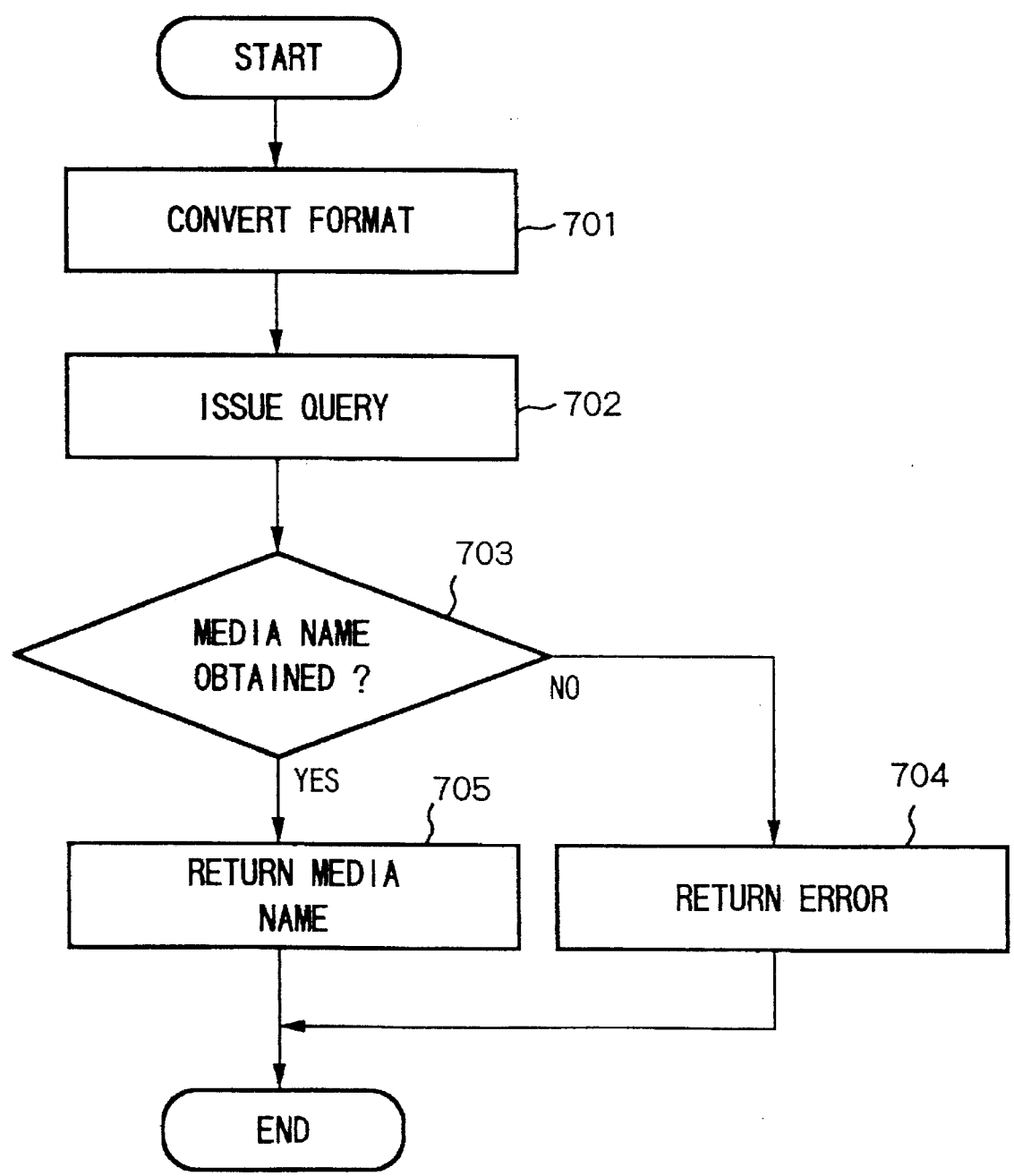
FIG. 7 is a flowchart showing an operation of a media identifying portion in the second embodiment of the multi media presentation system.

FIG. 7 is a flowchart showing the operation of the media identifying portion 51. The operation of the media identifying portion 51 will be discussed in detail with reference to FIG. 7.

Upon retrieval of media, the format of retrieval expression is converted into a query format adapted to the database (step 701). Then, query for the media name is issued to the media database portion 57 (step 702).

Then, check is performed whether the media name is obtained as the result of query (step 703). When the media name is obtained as the result of query, the media name is returned to the media display table managing portion 13, and then the process is terminated (step 704).

The operation and process content of the instruction executing portion 11 and the display processing portion for controlling media display are the same as those of the first embodiment.

As set forth above, according to the present invention, since the display effect and designation of spacial movement of the media data are described in the scenario, the multi media statement including complicated state transition and display effect can be generated. Namely, it becomes possible to vary the lightness or luminance of the currently displayed media at the specific period, to provide special effect, to move the display region, to expand and contract the display region and so forth.

On the other hand, since the media name is written as internal information of the instruction and the media name is not directly written in the scenario, application of the scenario for other instruction is facilitated.

Furthermore, by including the description of the database like query in the scenario, dynamic and interactive display of the media data depending upon the user input or the display condition of the display screen becomes possible. By this, the amount of description in the scenario can be reduced to contribute reduction of the data amount in the multi media statement.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as being limited to the specific embodiment set out above but to include all possible embodiments which can be embodied within a scope encompassed and equivalents thereof with respect to the feature set out in the appended claims.

What is claimed is:

1. A multi media presentation system comprising;
    storage means for storing a multi media statement including a scenario which specifies when an instruction for controlling display of media data in a display region and for controlling variation of display condition of the displayed media data is to be executed by designating a predetermined start condition for said instruction, and at least one of media data to be displayed and storage position information of the media data;
    media display table managing means for storing, as a media display table, information relating to the display region of said media data and information relating to the display condition;
    instruction executing means for executing said instruction and updating said media display table;
    display control means for displaying said media data and varying the display condition of the displayed media data on the basis of the media display table stored in the media display table managing means; and
    display processing means for reading said scenario and issuing a command to execute said instruction to said instruction executing means upon occurrence of the predetermined start condition in said scenario,
    wherein said scenario specifies as said predetermined start condition at least one of instruction execution timing, a specific user input through an input means, and specific display condition of the media data.

2. A multi media presentation system as set forth in claim 1, wherein the instruction includes at least a media display table name, an instruction name, a media data name, a delay period for execution of the instruction, and a parameter for execution of the instruction.

3. A multi media presentation system as set forth in claim 1, wherein said display processing means identifies the scenario and, upon occurrence of the predetermined start condition, commands execution of said instruction to said instruction executing means.

4. A multi media presentation system as set forth in claim 3, further comprising display management table storing means for storing instructions in order of execution, wherein said instruction executing means arranges the instructions in the order of execution in a display management table and executes the instruction arranged in the display management table in the order of execution.

5. A multi media presentation system as set forth in claim 4, wherein, when execution of the instruction for varying the display condition of the media data according to an elapsed time is commanded, said instruction executing means divides said instruction into a plurality of stages of display condition of the media data and into a plurality of instructions for performing display at each stage, and arranges the divided instructions in said display management table.

6. A multi media presentation system as set forth in claim 1, wherein said scenario specifies said specific user input and said specific display condition of the media data as said predetermined start condition.

7. A multi media presentation system as set forth in claim 1,
    wherein said display processing means identifies the scenario and, upon occurrence of said predetermined start condition, commands execution of said instruction to said instruction executing means, and
    wherein said instruction executing means arranges the instruction designated by said display processing means, updates said media display table by executing the instruction in an order of execution, and transfers the updated media display table to said media display table managing means for modifying the display condition of the media data.

8. A multi media presentation system as set forth in claim 7, wherein the scenario specifies a constraint which includes at least a designation of a preferential order under conditions where media data display is conflicting between at least a plurality of media display tables.

9. A multi media presentation system as set forth in claim 1,
    wherein said multi media statement contains at least a media data name, a display region information indicating a display position, a display size and a display method for displaying said media data as an initial state of the media data display, and
    wherein said media display table managing means stores said display region information contained in said multi media statement as the initial value of the media display table at the initial state of the media data display.

10. A multi media presentation system as set forth in claim 1,
    wherein the instruction contained in said multi media statement includes a media type indicative of a category of the media data to be displayed and a media data retrieval expression for retrieving the media data, and
    wherein said system further comprises a media database for managing and storing the media data for each media type, said media data which is to be displayed being identified by issuing a query to said media database with the media type and the media data retrieval expression.

11. A multi media presentation system comprising:
    storage means for storing a multi media statement including a scenario which prescribes a constraint between a plurality of display regions and specifies when an instruction for controlling display of media data in a display region and variation of display condition of the displayed media data is to be executed in accordance with a predetermined start condition, and at least one of media data to be displayed and storage position information of the media data;
    media display table managing means for storing, as a media display table, information relating to the display region of said media data and information relating to the display condition;

instruction executing means for executing said instruction and updating said media display table;

display control means for displaying said media data and varying the display condition of the displayed media data on the basis of the media display table stored in the media display table managing means;

display processing means for identifying a scenario to be executed from said multi media statement, reading said scenario, and, upon occurrence of the predetermined start condition in said scenario, issuing a command to execute said instruction to said instruction executing means; and recording means for recording a display management table which stores instructions to be executed by said instruction executing means in an order of execution, wherein said instruction executing means arranges the instructions in said display management table in the order of execution and executes the instructions arranged in said display management table in the order of execution, and wherein said scenario specifies as said predetermined start condition for said instruction at least one of instruction execution timing, a specific user input through an input means, and specific display condition of the media data.

12. A multi media presentation system as set forth in claim 11, wherein said multi media statement contains at least a media data name, a display region information indicating a display position, a display size and a display method for displaying said media data as an initial state of the media data display, and wherein said media display table managing means stores said display region information contained in said multi media statement as the initial value of the media display table at the initial state of the media data display.

13. A multi media presentation system as set forth in claim 11, wherein the instruction includes at least a media display table name, an instruction name, a media data name, a delay period for execution of the instruction, and a parameter for execution of the instruction.

14. A multi media presentation system as set forth in claim 11, wherein said scenario specifies as said predetermined start condition said specific user input and said specific display condition of the media data.

15. A multi media presentation system as set forth in claim 11, wherein said instruction executing means updates said media display table by executing instructions arranged in said display management table, and when update of the media display table satisfies the constraint, the updated media display table is transmitted to said media display table managing means for modifying the display condition of the media data.

16. A multi media presentation system as set forth in claim 11, wherein, when execution of the instruction for varying the display condition of the media data according to an elapsed time is commanded, said instruction executing means divides said instruction into a plurality of stages of display condition of the media data and into a plurality of instructions for performing display at each stage, and arranges the divided instructions in said display management table.

17. A multi media presentation system as set forth in claim 11, wherein the instruction contained in said multi media statement includes a media type indicative of a category of the media data to be displayed and a media data retrieval expression for retrieving the media data, and wherein said system further comprises a media database for managing and storing the media data for each media type, said media data which is to be displayed being identified by issuing a query to said media database with the media type and the media data retrieval expression.

* * * * *